United States Patent
Wakatsuka et al.

[11] Patent Number: 5,374,485
[45] Date of Patent: Dec. 20, 1994

[54] COMPOSITE POLYACETAL ARTICLE

[75] Inventors: Sei Wakatsuka, Shimizu; Jun Fukasawa, Fuji, both of Japan

[73] Assignee: Polyplastics Co., Ltd., Osaka, Japan

[21] Appl. No.: 76,710

[22] PCT Filed: Oct. 3, 1991

[86] PCT No.: PCT/JP91/01341

§ 371 Date: May 29, 1992

§ 102(e) Date: May 29, 1992

[87] PCT Pub. No.: WO92/06137

PCT Pub. Date: Apr. 16, 1992

Related U.S. Application Data

[62] Division of Ser. No. 852,191, May 29, 1992, abandoned.

[30] Foreign Application Priority Data

Oct. 4, 1990 [JP] Japan .................. 2-268072

[51] Int. Cl.$^5$ ................ B32B 27/40
[52] U.S. Cl. ................ 428/423.1; 528/48; 528/230; 528/233; 528/266; 525/399
[58] Field of Search ......... 528/48, 230, 233, 266; 525/399; 428/373, 423.1

[56] References Cited

U.S. PATENT DOCUMENTS

| | | |
|---|---|---|
| 3,619,268 | 11/1971 | Robertson et al. |
| 4,160,851 | 7/1979 | Leinert et al. .......... 427/379 |
| 4,410,595 | 10/1983 | Matsumoto et al. ........ 428/412 |
| 4,751,103 | 6/1988 | Goel .................. 427/54.1 |
| 4,780,498 | 10/1988 | Goerrissen et al. ....... 524/456 |
| 4,868,268 | 9/1989 | Muller et al. ........... 528/76 |
| 4,940,750 | 7/1990 | Rosthauser et al. ....... 524/871 |
| 4,996,103 | 2/1991 | Henn et al. ............ 428/305.5 |
| 5,009,950 | 4/1991 | Wagner et al. .......... 428/290 |

*Primary Examiner*—Samuel A. Acquah
*Attorney, Agent, or Firm*—Nixon & Vanderhye

[57] ABSTRACT

A polyacetal resin composition which comprises a polyacetal resin (as component A) and one or more members selected from the group consisting of an isocyanate compound, isothiocyanate compound, and modified product thereof (as component B) in an amount of 0.1–15 wt % of the composition, said polyacetal resin composition exhibiting good adhesion properties when bonded with a curable reactive resin adhesive. The present invention also relates to a part comprising a combination of the mold consisting of the composition and the adhesive.

6 Claims, No Drawings

COMPOSITE POLYACETAL ARTICLE

This is a division of application Ser. No. 07/852,191, filed May 29, 1992 now abandoned.

FIELD OF INVENTION

The present invention relates to a polyacetal resin composition having improved adhesion properties. More particularly, it is concerned with a polyacetal resin composition formed by melting and kneading a polyacetal resin with one or more members selected from the group consisting of an isocyanate compound, an isothiocyanate compound, and a modified product thereof. The polyacetal resin composition of this invention can be utilized as a material forming a molded product which exhibits greatly improved adhesion properties with a curable reactive resin adhesive.

BACKGROUND AND SUMMARY OF INVENTION

Polyacetal resin is one of the typical engineering plastics having outstanding mechanical-strength, heat resistance, and chemical resistance properties. It finds general use as parts of automobiles, household electric appliances, and precision machines.

Molded parts formed of polyacetal resin when used for such purposes are usually assembled with other components by press fitting or staking. However, the parts may be bonded adhesively to one another or to components formed of metal, glass, or any other materials. The bonding of part (such as automotive parts which are subject to vibration and considerable temperature change is, in particular, accomplished by the aid of a curable reactive adhesive such as an epoxy resin or a silicone resin.

The molded products of polyacetal resin have outstanding chemical resistance owing to their inert surface. On the other hand, they often exhibit poor adhesion properties with adhesives. To cope with this situation, they usually undergo pretreatment, for example, surface treatment (surface roughening) with corona discharge, UV light irradiation, or acid etching, or primer coating onto the surface of the resin, prior to bonding with an adhesive. However, pretreatment of polyacetal resin parts increases the complexity of the production process which, in turn, can increase production costs.

The foregoing problems have led to a demand for suitable adhesives for polyacetal resin as well as a polyacetal resin having a greater affinity for adhesives. However, nothing to meet this demand has thus far been proposed.

The present invention is directed toward a new polyacetal resin composition which yields molded products capable of bonding firmly with a curable reactive resin adhesive (such as epoxy resin adhesive or a silicon resin adhesive) without needing of any surface pretreatment. In this regard, the polyacetal resin composition according to this invention achieves such a result by virtue of the incorporation of an isocyanate compound or an isothiocyanate compound.

More specifically, the present invention is embodied in a polyacetal resin composition which comprises a polyacetal resin (as component A) and one or more members selected from the group consisting of an isocyanate compound, an isothiocyanate compound, and a modified product thereof (as component B) in an amount of 0.1–15 wt % of the composition. The polyacetal resin composition adhesion properties when bonded with a curable reactive resin adhesive.

DETAILED DESCRIPTION OF THE PREFERRED EMBODIMENTS

The polyacetal base resin (component A) used in the present invention is a polymer which is composed mainly of oxymethylene groups ($-CH_2O-$). It may be a polyoxymethylene homopolymer, copolymers containing a small amount of other constitutive unit other than oxymethylene group (which include block copolymers) or terpolymers. Moreover, it may be one having a branched or crosslinked constitution as well as one having a linear constitution.

It is presumed that unreacted isocyanate or isothiocyanate groups remain inside, and particularly remains at the surface, of molded products after an isocyanate compound, an isothiocyanate compound and a modified product thereof (component B), are melt-blended with the polyacetal base resin. These unreacted isocyanate or isothiocyanate groups are thereby present to react with a curable reactive resin adhesive (such as silicone resin adhesive) to form covalent bonds which are responsible for high adhesion strength with the polyacetal resin composition.

Component B is a compound having two or more isocyanate groups or isothiocyanate groups in one molecule, and includes the following:

Aromatic isocyanate compounds such as diphenylmethane-4,4'-diisocyanate, diphenylpropane-4,4'-diisocyanate, 2,4-tolylene diisocyanate, and 2,6-tolylene diisocyanate;

Aromatic isothiocyanate compounds corresponding to these, such as diphenylmethane-4,4'-diisothiocyanate and 2,4-tolylene diisothiocyanate, and dimers and trimers thereof;

Aliphatic and alicyclic isocyanate compounds such as 1,4-butylenediisocyanate, 1,6-hexamethylenediisocyanate, cyclopentyl-1,3-diisocyanate, 4,4'-dicyclohexylmethanediisocyanate, and isophorone diisocyanate; and Aliphatic and alicyclic isothiocyanate compounds corresponding to these, such as 4,4'-dicyclohexylmethanediisothiocyanate and isophorone diisothiocyanate, and dimers and trimers thereof.

Any of the above-mentioned compounds may be used as component B to produce the desired effect of the present invention. Preferred is an aliphatic or alicyclic isocyanate or isothiocyanate compound with comparatively low reactivity. The isocyanate compound is more desirable. A modified product or derivative such as a dimer or trimer of isophorone diisocyanate is most desirable from the standpoint of discoloration (which occurs during melting), irregular color, reactivity, and handling safety. In the case that an aromatic isocyanate compound is added, the reactivity of the isocyanate group is quite high thereby creating a tendency for aromatic isocyanate compound to discolor the polyacetal base resin when melt-blended therewith. Additionally, because few isocyanate groups remain after melt blending when an aromatic isocyanate compound is added in a small amount, in sufficient adhesion strength results when a curable reactive resin adhesive is employed. Moreover, aromatic isocyanate components deleteriously affect the inherent beneficial properties of polyacetal resin and tends to cause discoloration when used in amounts large enough to provide a high bond strength.

By contrast, aliphatic and alicyclic isocyanate compounds, which have comparatively low reactivity, retain unreacted isocyanate groups even after melt-kneading and molding. Therefore, such compounds produce a sufficient bond strength when used in relatively small amounts as to produce no adverse effect on the properties of polyacetal resin and/or discoloration during compounding and molding.

The isocyanate compound, an isothiocyanate compound and a modified product thereof (component B) should be used in an amount of 0.1–15 wt % of the composition. An amount of 2–10 wt % is desirable to prevent deterioration of the polyacetal's and properties moldability due to an increased viscosity owing to the reaction of the isocyanate compound, and the like, as well as to obtain enhanced adhesion effects.

Though the organic filler (component C) which is used in the present invention is not an essential component, the incorporation of an inorganic filler is desirable to provide molded products having good mechanical strength, heat resistance, dimensional stability (resistance against the change of the shape and warpage) and electrical properties. The inorganic filler may be in the form of fiber, powder, granule, and flake, which are selected according to the intended use.

Examples of the fibrous inorganic filler include glass fiber, carbon fiber, silica fiber, boron fiber, potassium titanate fiber, and other inorganic fibrous materials. Organic fibrous materials such as polyamide fiber and acrylic fiber having a high melting point may be used in place of the inorganic fibrous filler.

Examples of the powdery and granular filler include carbon black, silica, glass bead, glass powder, talc, clay, silicate (such as wollastonite), metal oxides (such as iron oxide, titanium oxide, zinc oxide, and alumina), metal carbonates (such as calcium carbonate and magnesium carbonate), metal sulfate (such as calcium sulfate), silicon carbide, silicon nitride, boron nitride, and metal powder.

Examples of the flaky filler include mica, glass flake, and metal foil.

Among these, inorganic fillers which mainly comprise glass fiber, glass bead, glass flake or the like are preferable.

These inorganic fillers may be used alone or in combination of two or more of the same. A combination of a fibrous filler (especially glass fibers) and a granular and/or flaky filler is preferable to impart good mechanical strength, dimensional stability, and electrical properties.

According to the present invention, the amount of the inorganic filler (as component C), if used, should be 1–50 wt %, preferably 5–30 wt %, of the composition. If the inorganic filler is used in excess of 50 wt %, will be difficult to mold and process the composition, and produces an adverse effect on the mechanical properties of molded products.

Examples of adhesives which show an adhesive effect with respect to the polyacetal resin composition according to the present invention, include curable reactive resin adhesives which produce their adhesion strength through a curing reaction after its application. That is, suitable adhesive may be those which contain, as an adhesive component, a thermosetting resin such as epoxy resin, polyurethane, silicone resin, formaldehyde resin and the like. Such adhesives produce high adhesive strength because the adhesive components react at room temperature with unreacted isocyanate groups or unreacted isothiocyanate groups remaining at the surface of a molded article according to this invention.

A further increase in adhesive strength can be obtained by heating after application of the adhesive. Though every curable reactive resin adhesives described above exhibits excellent adhesive strength, those based on silicone resin, polyurethane, and epoxy resin are preferable due to their high bond strength and practical performance (such as wide temperature range for use).

Objects to be bonded to the molded article of the polyacetal resin composition according to the invention include polyacetal and other resins, metals, glass and the like which can be adhered by using a curable reactive resin adhesive.

The polyacetal resin composition of the present invention may include virtually any known additives to impart desired properties according to its intended use. Examples of such additives include lubricants, nucleating agents, mold release agents, antistatic agents and other surfactants and the like. They may be added under the condition that the isocyanate compound or isothiocyanate compound still remains unreacted in the molded product.

The polyacetal resin composition of the present invention may be prepared by any known process and apparatus for ordinary synthetic resin compositions. In other words, it may be prepared by mixing necessary components, kneading the mixture by using a single-screw or twin-screw extruder, extruding the mixture into pellets and molding the pellet. Alternatively, it is possible to perform the compounding and molding simultaneously using a molding machine. For better dispersion and mixing of every components, pellets may be obtained by crushing part or all of the resin components, followed by mixing, melt-extruding and molding.

The components such as the above-mentioned stabilizers and additives may be added at any stage. It is also able to add and mix them immediately before molding.

The polyacetal resin composition of the present invention is suitable for extrusion molding, injection molding, compression molding, vacuum molding, blow molding, and foam molding.

Molded articles consisting of the composition according to the present invention exhibit good adhesion properties even without any surface pretreatment when bonded with a curable reactive adhesive. The resin composition exhibits excellent extrusive and molding properties and no deterioration of mechanical properties. The resin composition is suitable for the production of parts and articles to be bonded with a silicone resin-based adhesive.

EXAMPLES

The invention will be described in more detail with reference to the following examples, which are not intended to restrict the scope of the invention. Examples 1 to 8 and Comparative Examples 1 to 3

A polyacetal resin composition in pellet form was prepared from a polyacetal copolymer ("Duracon", a product of Polyplastics Co., Ltd.), an isocyanate compound or isothiocyanate compound, and glass fiber (optional) by melt-kneading at 210° C. using a twin-screw extruder according to the formulation shown in Table 1. The pellet was injection-molded to a tensile test piece (conforming to ASTM Type I) by injection molding. The test piece was cut in half at its center, and the cut halves were joined together with an adhesive shown in Table 1. (The adhesion area was 1.95 cm². ) After curing for 48 hours at 23° C., the specimen was tested for tensile shear bond strength. The results are shown in Table 1.

adhesive layer to adhesively surface-bond said at least one and another components.

2. A composite article as in claim 1, wherein said aliphatic or alicyclic polyisocyanate compound is selected from the group consisting of 1,6-hexamethylenediisocyanate, isophorone diisocyanate, and di-

TABLE 1

|  | Component (A) Polyacetal resin | Component (B) Isocyanate compound*¹ (wt %) | | Component (C) Inorganic filler (wt %) | Adhesive*² | Tensile shear bond strength (kg/cm²) |
| --- | --- | --- | --- | --- | --- | --- |
| Example 1 | 97 wt % | IPDI-D | (3) | — | Silicone | 14.0 |
| Example 2 | 97 wt % | IPDI-T | (3) | — | Silicone | 9.6 |
| Example 3 | 95 wt % | IPDI-T | (5) | — | Silicone | 15.9 |
| Example 4 | 92 wt % | IPDI-T | (8) | — | Silicone | 17.9 |
| Example 5 | 97 wt % | MDI | (3) | — | Silicone | 7.0 |
| Example 6 | 97 wt % | HDIT | (3) | — | Silicone | 12.5 |
| Example 7 | 95 wt % | IPDI-T | (5) | — | Epoxy | 25.7 |
| Example 8 | 70 wt % | IPDI-T | (5) | Glass fiber (25) | Epoxy | 30.3 |
| Comparative Example 1 | 100 wt % | — | | — | Silicone | 3.1 |
| Comparative Example 2 | 100 wt % | — | | — | Epoxy | 13.4 |
| Comparative Example 3 | 75 wt % | — | | Glass fiber (25) | Epoxy | 18.5 |

Note to Table 1.
*¹IPDI-D Isophorone diisocyanate dimer
IPDI-T Isophorone diisocyanate trimer
MDI 4,4'-methylenebis(phenylisocyanate)
HDIT Hexamethylenediisothiocyanate
*²Silicone resin-based adhesive, "SE9500" from Toray Dow-Corning Silicone Co., Ltd.
Epoxy resin-based adhesive, "EP-001" from Cemedyne Co., Ltd.

We claim:

1. A composite article which includes at least two components, and a cured reactive adhesive layer interposed between and surface-bonding said at least two components one to another, wherein at least one of said at least two components consists essentially of a molded polyacetal resin composition comprised of a melt-blend of (a) a polyacetal base resin, and (B) an amount between 0.1 to 15% by weight of an aliphatic or alicyclic polyisocyanate compound sufficient to provide unreacted isocyanate groups at a surface of said one component to be bonded to said another component, and wherein said isocyanate groups at said surface of said at least one component are reacted with said reactive resin mers and trimers thereof.

3. A composite article as in claim 1, which further comprises (C) an inorganic filler.

4. A composite article as in claim 3, wherein the inorganic filler is at least one glass filler selected from the group consisting of glass fibers, glass beads and glass flakes.

5. A composite article as in claim 1, wherein said aliphatic or alicyclic polyisocyanate compound is present in an amount between 2 to 10% by weight.

6. A composite article as in claim 1, wherein said cured reactive resin adhesive is selected from the group consisting of silicone resins, polyurethane resins, and epoxy resins.

* * * * *

UNITED STATES PATENT AND TRADEMARK OFFICE
CERTIFICATE OF CORRECTION

PATENT NO. : 5,374,485
DATED : December 20, 1994
INVENTOR(S) : Wakatsuka et al.

It is certified that error appears in the above-identified patent and that said letters patent is hereby corrected as shown below:

ABSTRACT, line 10, delete "of the mold consisting";

Column 1, line 32, change "part" to --parts--;
    line 32, after "automotive parts" insert --)--.

Column 2, line 2, after "composition" insert --exhibits improved";
    line 10, change "unit" to --units--;
    line 11, change "group" to --groups--;

Column 3, line 15, delete "and properties";
    line 24, delete "the" twice;

Signed and Sealed this

Thirtieth Day of May, 1995

Attest:

BRUCE LEHMAN

*Attesting Officer*      *Commissioner of Patents and Trademarks*